Patented Sept. 3, 1940

2,213,513

UNITED STATES PATENT OFFICE 2,213,513

SOLUBLE ORGANIC PHOSPHATE FERTILIZER MATERIALS

Wilder D. Bancroft, James K. Wilson, and John E. Rutzler, Jr., Ithaca, N. Y.

No Drawing. Application January 8, 1937, Serial No. 119,680

3 Claims. (Cl. 71—27)

Our invention relates to methods for top-soil and sub-soil fertilization with phosphorus by means of water-soluble compounds of phosphorus which will only very slowly revert in contact with the soil to unavailable insoluble phosphorus compounds and to mixtures containing these compounds.

Since soluble calcium, magnesium, aluminum and iron salts react with such inorganic phosphorus compounds as are commonly used as fertilizer materials to form very insoluble compounds, an important object of many researches is to obtain utilizable, non-toxic, water-soluble phosphorus compounds which will not quickly form such slightly soluble calcium, magnesium, iron and aluminum salts in contact with the soil when applied to the land. The reason for this is that unless there are a very large number of very finely divided particles of these very slightly soluble phosphates, they do not supply enough phosphorus to the soil solution to satisfy the phosphorus requirements of plants grown in the soil in which they are formed. Superphosphate, under most conditions, for instance, becomes only slightly soluble after a short period of time in the soil, though when first put on it is very soluble.

An illustration of this is an experiment in which superphosphate was added to a plot of ground for fifty years at the rate of 392 pounds per year. At the end of the fifty years only 15% of the total amount of superphosphate had been removed by plants which were grown on that ground. Either 85% of the applied fertilizer was wasted in the above experiment, or the plants required only 15% of the amount of phosphorus which was applied. Fifteen percent of 392 is 58.8 pounds of superphosphate which must be roughly the amount used by the plants each year. The agronomist would not expect a maximum return, as measured by plant growth, from the application to the land of so small an amount of superphosphate as 58.8 pounds per acre per year under any ordinary conditions. So, we may conclude that 58.8 pounds per acre per year of superphosphate applied to the land under ordinary conditions will not supply enough soluble phosphorus for maximum plant growth. This means that there is a great economic wastage in present day superphosphate fertilizer practices. This is probably due to a rapid reversion of applied superphosphate to very insoluble phosphorus compounds, as a result of which the availability of the phosphorus is greatly reduced.

It is an important object of our invention to prevent this apparent wastage of material and to supply a phosphatic fertilizer material which will produce excellent results, as judged by plant growth, after application to the soil of much smaller quantities of phosphorus than are used in present day fertilizing procedures. Other objects and advantages of our invention will be readily apparent from the ensuing description.

It is known that when, for instance, superphosphate is applied to the land, the surface layer of the soil contains most of the added fertilizer, even when the ground is well worked; whereas the root systems of most crop plants extend far below this surface layer. As a result, much better fertilization will result from the deeper diffusion into the soil which will be obtained when water soluble phosphorus compounds, which are not rapidly changed in contact with the soil into very insoluble compounds, are applied to the land as fertilizer materials. It is an object of our invention to supply to the soil such phosphorus compounds. It is clear that such phosphorus compounds will retain the phosphorus in an available form for a longer period of time than, for instance, any of the forms of superphosphate.

Our invention may comprise in part the strewing on the land in small amounts, by any suitable means, certain stable and soluble organic phosphates and/or metallic salts of such organic phosphates. In an alternate form this invention comprises mixing with other non-phosphatic fertilizer materials appropriate quantities of said table, soluble organic phosphates and/or their salts and strewing the mixtures upon the soil by any appropriate means; the invention relates also to the mixtures themselves. In yet another ramification, our invention may comprise mixing said stable, soluble organic phosphates and/or their salts with other fertilizing materials which include an inorganic calcium, iron, magnesium or aluminum phosphate from which the said organic phosphate may be derived; the invention also relates to such mixtures as these. Our fertilizer materials are placed upon the top-soil and then preferably, though not necessarily, worked into the soil by cultivation to facilitate a more even distribution in said top-soil. Then, since our phosphatic materials are water-soluble and not easily hydrolyzed, they make their way deep into the soil partly by diffusion and partly by the washing action of the rain water. They thus become available to much of the root systems of the plants grown on the fertilized land.

This invention is carried out by the use of relatively stable, soluble organic phosphates, such as mono-, di- or trimethyl phosphate; mono-, di- or triethyl phosphate; mono-, di- or tripropyl phosphate; and to somewhat less advantage, mono-, di- or tributyl phosphate, or by the use of a mixture of any two or more of said organic phosphates. Alternatively, we may prefer to use monomethyl dicalcium phosphate or dimethyl monocalcium phosphate or monoethyl dicalcium phosphate or diethyl monocalcium phosphate or the corresponding propyl or butyl compounds of phosphoric acid, or the corresponding derivatives of metaphosphoric acid, or any combination of these, or any combination of these with any combination of the above mentioned organic phosphates which do not contain calcium. It should be clearly understood that we are using the terms "phosphoric acid" and "phosphate" generically to include all of the acids of phosphorus of their anhydrides.

Instead of calcium salts of these alkyl phosphates, we may prefer to use, for instance, the iron, aluminum, magnesium, sodium or potassium salts of said phosphates or some combination thereof. Instead of any of the above organic phosphates, we may prefer to use the corresponding isopropyl or isobutyl phosphates and/or their salts or mixtures thereof. Or we may use alkylene phosphates such as ethylene, propylene, butylene phosphate and/or their salts or mixtures thereof. Allyl, vinyl, ethylmethyl, ethylpropyl, methylpropyl and propargyl phosphates and their salts may be employed and are covered by this invention.

There are many known general methods, some of which we have employed, for the preparation of these compounds and their salts. Two general methods will be given by way of example. In the following equations "R" refers to the alkyl radicals mentioned above.

1. $3ROH + P_2O_5 \rightarrow R_2HPO_4 + RH_2PO_4$
$RH_2PO_4 + Ca(OH)_2 \rightarrow CaRPO_4 + 2H_2O$
$2R_2HPO_4 + Ca(OH)_2 \rightarrow CaR_4(PO_4)_2 + 2H_2O$
2. $ROH + H_3PO_4 \rightarrow RH_2PO_4 + H_2O$
3. $2ROH + H_3PO_4 \rightarrow R_2HPO_4 + 2H_2O$
4. $ROH + HPO_3 \rightarrow RPO_3 + H_2O$ Equation 4 is for the preparation of an alkyl metaphosphate. Clearly, it is necessary to remove the water nearly as fast as it is formed in using methods 2, 3 and 4 in order to obtain reasonably good yields of organic phosphate. There are well-known methods of accomplishing this.

A peculiar characteristic of all of these organic phosphates which have been mentioned is that when hydrolyzed they yield alcohols which contain only one hydroxyl group. Likewise, in every case the final compound has from one to three hydroxyl groups less than the phosphoric acid from which it is derived. Our compounds do not derive their solubility from the introduction into the phosphoric acid molecule of hydroxyl groups.

The organic phosphates, which we use, do not derive solubility from the introduction into the phosphoric acid molecule of hydroxyl groups attached to the carbon atoms or atom of the organic compound from which they are formed. In fact, the stability of the several organic phosphates in contact with the soil is of much greater importance in the operation of our invention than is the solubility of said organic phosphates, so long as they are slightly water-soluble to begin with.

This stability of the compounds, which we use in our invention, results in a wide and deep distribution of the materials throughout the soil as a result of rains and cultivation. This distribution results from the fact that these compounds are neither so soluble that they tend to wash out of the soil nor so insoluble as to hinder their wide and deep distribution. In contrast to other phosphatic material, the solubilities of our organic phosphates in the soil solution are in the region between too insoluble to penetrate and diffuse well and so soluble that a loss of fertilizer material results from the material completely washing out of the area occupied by the roots of crop plants.

Not only are these organic phosphates remarkably stable but after their association in the soil resulting from the splitting off of the alkyl radical we have found that many plants are able to utilize the phosphorus more readily. This is in contra-distinction to the complete unavailability of the phosphorus after the decomposition of the phosphates now in use.

These compounds vary in solubility from very soluble to slightly more soluble than dicalcium phosphate. They also vary in stability. As a result, we may prefer to use one compound, such as a calcium ethyl phosphate, for fertilizing soil in more arid regions on account of its relatively high solubility and a compound such as a butyl or allyl phosphate in more humid regions, where the normal soil moisture is at a higher level, because they are much less soluble. However, we may under some conditions prefer to reverse this procedure. The above example is given only by way of illustration, and this invention is not to be considered to be limited thereto.

When superphosphate is mixed with moist soil which is low in phosphorus content and the mixture is allowed to stand for one or two days, and then leached with an amount of water equal to the weight of the soil, very little phosphorus is removed by the water when the soil is alkaline and highly calcareous; but when the soil sample chosen is slightly acid and contains only medium amounts of calcium, iron and aluminum, more of the added phosphate is leached out by this procedure; and the amount leached out increases with the acidity of the soil.

On the other hand, when a small amount of one of our organic phosphates, or one of our organo-metallic phosphates, is added to the soil and the mixture allowed to stand for one or two days and then leached with an amount of water equal to the weight of the soil, a large proportion of the phosphorus which went into solution is to be found in the leachate; and the amount of phosphorus found in the leachate is much less dependent upon the pH of the soil, over a wide range of acidity and alkalinity, than in the case of superphosphate. This illustrates the great difference between our organic phosphates and the most important commercial phosphatic fertilizer now in use as regards availability.

Another important advantage of our invention is that while supplying the needed phosphorus to plants it also supplies a utilizable form of carbon. This is illustrated by an experiment in which plants were grown in soil which was treated with ethyl sulphate and compared to plants grown in the same soil containing an added amount of an inorganic sulphate which was equivalent in sulphur to that added as ethyl sulphate. The plants grown in the soil containing the ethyl sulphate were larger than those grown in the soil containing the inorganic sulphate. This shows that the ethyl part of the ethyl sulphate supplied utilizable carbon. So the carbon in this type of water-soluble mineral acid ester can be utilized by plants. Since such organic compounds as monohydric alcohols, which result finally from the hydrolysis of our organic phosphates, are utilized by the nitrogen fixing organisms in the soil, the added carbon also results in an accretion of nitrogen which ultimately is assimilated by plants.

A number of examples of fertilizing processes and products which will accomplish the desired result of supplying available phosphorus to plants in a form which will penetrate deeply into the soil and which remains available over a comparatively long period of time will now be given. These examples are by way of illustration only, it being clearly understood that there are many possible qualitative and quantitative combinations of the compounds and/or their metallic salts which we claim as our invention and which will accomplish the desired results. It should be clearly understood that there are equivalent methods of carrying out our invention which will be obvious to those skilled in the art.

*Example 1*

This is an example of the form of our invention in which a stable, soluble organic phosphate or combination of organic phosphates and/or combination of organo-metallic phosphates with or without admixture of organic phosphates is strewn on the land in small amounts compared to the amount of superphosphate which ordinarily would be used. We may use for this purpose fifty pounds per acre of diethyl monocalcium phosphate in water solution, for instance. This may be applied to the soil in any one of a number of ways which are familiar to those skilled in the art. Or it may be sprayed on the land, for instance, by means of insecticide spraying apparatus.

The application of our fertilizer compounds to the land is made preferably after the ground has been plowed and soon before the crop seeds are to be planted, although it should be clearly understood that it may be applied at any time and no matter what the condition of the ground. Further, it should be clearly understood that any other of the compounds or any desired mixture thereof without regard to proportions may be used in place of diethyl monocalcium phosphate. While fifty pounds per acre are used in this example as an excellent dosage, the amount of any of our new fertilizer materials which will be required will vary over a very wide range, depending upon the soil, the climate and the particular fertilizing material used. Therefore, we do not limit our invention to any particular amounts of the different new fertilizer materials to be used.

As an example of another fertilizing material, we may strew upon the land fifty-five pounds of tripropyl phosphate or sixty pounds of dipropyl monomagnesium phosphate per acre by any suitable means. When the land is very alkaline, having a pH of above 7.8, for example, we may prefer to treat it with some acid or acidic substance prior to the application of our organic phosphates, in order to render the soil less active in decomposing said organic phosphate.

*Example 2*

This is an example of a form of our invention wherein our new fertilizer materials are applied to the soil in admixture with non-phosphorus fertilizer materials which non-phosphatic materials serve the double purpose of making the soil more fertile and at the same time render the soil solution considerably less active in decomposing the organic phosphate. For this purpose we use a mixture of lime, limestone or marl with any one or any combination of our new fertilizer compounds. Such mixtures will prove especially useful in very acid soils, their effectiveness decreasing as the acidity of the soil decreases. Up to a certain point neutralization of the soil will in itself cause better crops to be produced. At the same time, said neutralization will tend to reduce the hydrolysis of the organic phosphate which is used. In order to accomplish this we may use any one of the following three compositions or their equivalents, the amounts given being those required for fertilization of one acre.

(1)

| | Pounds |
|---|---|
| Limestone | 2000 |
| Dimethyl monocalcium phosphate | 45 |

(2)

| | |
|---|---|
| Lime | 1000 |
| Triethyl phosphate | 55 |

(3)

| | |
|---|---|
| Marl | 500 |
| Diisopropyl monocalcium phosphate | 70 |

It should be understood that any one or any combination of our new fertilizer compounds may be used in any desired amount in place of those specified. Furthermore, any ratio of lime, limestone or marl to organic phosphate may be used. The absolute amount of lime, limestone or marl to be used will depend upon the acidity of the soil upon which it is to be used, the only object of these materials being to reduce the acidity, or increase the alkalinity, of the soil for the purpose of reducing the amount of hydrolysis of the organic phosphate and making the land more fertile.

*Example 3*

This is an example of the form of our invention in which our new fertilizer materials are applied to the soil, by any convenient method, in admixture with non-phosphatic fertilizer materials so as to make a complete fertilizer having a smaller bulk than those used in commercial practice today, which new complete fertilizer has all of the advantages of the new organic phosphates. In order to make these new complete fertilizers, we may use any one of the following compositions or their equivalents, the amounts given being those required for the fertilization of one acre.

(1)

| | Pounds |
|---|---|
| Potassium chloride | 200 |
| Ammonium sulphate | 200 |
| Diethyl monocalcium phosphate | 40 |
| Tripropyl phosphate | 15 |
| Diethylene monomagnesium phosphate | 5 |

(2)

| | Pounds |
|---|---|
| Sodium nitrate | 150 |
| Potassium sulphate | 150 |
| Dimethyl monosodium phosphate | 35 |
| Diethyl monoammonium phosphate | 15 |

(3)

| | Pounds |
|---|---|
| Ammonium chloride | 150 |
| Potassium or sodium sulphate | 150 |
| Triethyl phosphate | 40 |
| Diethyl monomagnesium phosphate | 30 |

(4)

| | Pounds |
|---|---|
| Potassium chloride | 200 |
| Ammonium chloride | 150 |
| Calcium sulphate | 50 |
| Limestone | 1000 |
| Dimethyl monomagnesium phosphate | 30 |
| Diethylene monocalcium phosphate | 10 |
| Diethyl monosodium phosphate | 30 |

It is obvious that many combinations of the inorganic salts specified in these mixtures can be prepared; their proportions can be varied in many different ways; and a number of different organic phosphates and/or organo-metallic phosphates as well as combinations of said phosphates can be used to produce these complete fertilizers having less than the usual bulk of present-day complete fertilizers. Those skilled in the art can even introduce new combinations containing salts not specified here without departing from the substance of our invention.

*Example 4*

This is an example of fertilizer compositions having less bulk than those used in present day fertilizer practice which contain compounds from which the organic phosphate may be derived. These compounds from which the organic phosphates may be derived are tricalcium phosphate, dicalcium phosphate, ferric phosphate, aluminum phosphate, and trimagnesium phosphate. Their main function in these compositions is to reduce to a minimum any very slight tendency that the organic or organo-metallic phosphates may have to hydrolyze during storage. In the soil these inorganic phosphates will function to build up the phosphorus reserve. In the more acid soils the tricalcium phosphate and the dicalcium phosphate, in particular the former, neutralize the acidity partly, thus showing a double purpose. The amounts of materials as given are for the fertilization of one acre of land. It should be emphasized that the limits given in the following mixtures are by way of illustration only.

(1)

|  | Pounds |
|---|---|
| Tricalcium phosphate | 10–150 |
| Diethyl monocalcium phosphate | 5–200 |

(2)

|  | Pounds |
|---|---|
| Dicalcium phosphate | 10–100 |
| Dimethyl monosodium phosphate | 5–200 |

(3)

|  | Pounds |
|---|---|
| Trimagnesium phosphate | 15–75 |
| Dipropyl monomagnesium phosphate | 5–150 |

(4)

|  | Pounds |
|---|---|
| Dimagnesium phosphate | 15–150 |
| Diethylene monoammonium phosphate | 2–50 |
| Diethyl monopotassium phosphate | 10–150 |

Instead of using such mixtures as these, we may prefer to add the stabilizing inorganic phosphate to the complete fertilizer mixtures given in Example 3. Here again, many combinations of the compounds specified, as well as the substitution of other compounds which have not been specified, can be made without departing from the substance of our invention and will be obvious to those skilled in the art, since these mixtures are given by way of illustration only. It should be emphasized that haphazard mixtures will not only not accomplish the purpose for which the specified mixtures are designed, but may actually result in a more rapid than normal hydrolysis of the organic phosphates. For example, if a mixture is made which contains dicalcium phosphate and a dialkyl monocalcium phosphate or a monoalkyl dicalcium phosphate, the rate of hydrolysis of the organic phosphate may be increased due to the removal of calcium from the organic phosphate by the dicalcium phosphate to form the very insoluble tricalcium phosphate.

In general, our process comprises the addition of our fertilizers to the top-soil. Rains, or other moisture, cause the fertilizer units to be washed into the subsoil, so that they are available not only to the roots near the surface, but also to the roots growing at a greater depth.

We claim:

1. A new fertilizer comprising a mixture in predetermined proportions of diethylene monoammonium phosphate, diethyl monopotassium phosphate and dimagnesium phosphate, said last mentioned substance being in proportions sufficient to act as a stabilizer for the first mentioned organic phosphates.

2. A new fertilizer comprising a mixture in predetermined proportions of diethylene monoammonium phosphate and dimagnesium phosphate in proportions sufficient to act as a stabilizer for the said organic phosphate.

3. A new fertilizer comprising a mixture in predetermined proportions of diethyl monopotassium phosphate and dimagnesium phosphate in proportions sufficient to act as a stabilizer for the said organic phosphate.

WILDER D. BANCROFT.
JAMES K. WILSON.
JOHN E. RUTZLER, Jr.